US005304772A

United States Patent [19]

Snakenborg

[11] Patent Number: 5,304,772

[45] Date of Patent: Apr. 19, 1994

[54] PROCESS FOR THE PRODUCTION OF A METAL SCREEN, AND DEVICE FOR THE PRODUCTION THEREOF

[75] Inventor: Johannes T. Snakenborg, Dieren, Netherlands

[73] Assignee: Stork Screens B.V., Boxmeer, Netherlands

[21] Appl. No.: 998,637

[22] Filed: Dec. 30, 1992

Related U.S. Application Data

[63] Continuation of Ser. No. 635,127, filed as PCT/NL89/00060, Jul. 24, 1989, published as WO90/01414, Feb. 22, 1990, abandoned.

[30] Foreign Application Priority Data

Jul. 29, 1988 [NL] Netherlands ......................... 8801913

[51] Int. Cl.[5] .............................................. B23K 26/00

[52] U.S. Cl. ................................ 219/121.71; 148/241

[58] Field of Search ......................... 219/121.7, 121.71; 148/241

[56] References Cited

U.S. PATENT DOCUMENTS 4,156,807 5/1979 Howard et al. .................. 219/121.2

4,879,451 11/1989 Gart ............................... 219/121.69

4,932,112 6/1990 Tikkanen ................... 219/121.71 X

FOREIGN PATENT DOCUMENTS 957126 1/1957 Fed. Rep. of Germany .

1566544 5/1969 France .

2073180 9/1971 France .

*Primary Examiner*—C. L. Albritton

*Attorney, Agent, or Firm*—Michael N. Meller

[57] ABSTRACT

The invention relates to a process for the production of a metal screen by irradiating a metal basic layer with high-energy, focused radiation, wherein at least one metal basic layer (3) to be perforated to form a screen is supported in intimate contact on both opposite surfaces during the irradiation by a supporting element (1,5) adapted to the shape of the metal basic layer (3), using a release layer (2,4) between a supporting element (1,5) and the opposite surface of the metal layer (3), and after perforation the two supporting elements (1,5) and the release layers (2,4) are removed. According to the present process it is also possible to produce several screens at the same time by using a stack of metal basic layers (3,3′,3″), between which release layers (2′,2″) are present. The metal basic layer (3,3′,3″) is a copper or nickel-containing compound, preferably copper. The release layer (2,2′,2″) used is a layer of a metal compound, preferably a metal oxide or metal sulphide layer, and is preferably formed by conversion. The invention further relates to a device for the production of a metal screen, comprising a metal basic layer and a supporting element adapted to the shape of the basic layer, and means for the production of perforations, wherein the device is also provided with means for applying of a release layer (2,2′,2″,4) between a supporting element (1,5) and the opposite surface of the metal basic layer (3,3′,3″), and means for the removal of the supporting elements (1,5) and the release layers (2,2′, 2″,4) after the perforation operation.

22 Claims, 1 Drawing Sheet

Figure 1:
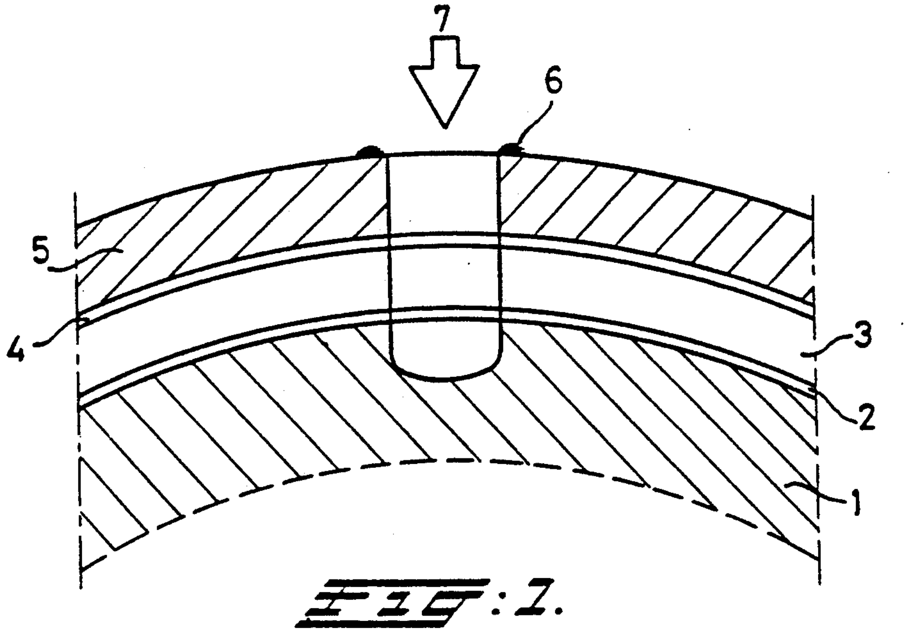

PROCESS FOR THE PRODUCTION OF A METAL SCREEN, AND DEVICE FOR THE PRODUCTION THEREOF

This application is a continuation, of application Ser. No. 635127, filed as PCT/NL89/00060, Jul. 24, 1989, published as WO90/01414, Feb. 22, 1990, abandoned.

The invention relates to a process for the production of a metal screen by irradiating a metal basic layer with high-energy, focused radiation.

Such a process is known per se.

The disadvantage of this known process is that, through the irradiation, bulges or burrs on the edges of the perforations formed, due to the fact that the material round the perforation to be formed is in a molten state for a brief period during the irradiation, and this material subsequently solidifies.

Such imperfections then have to be removed mechanically in a subsequent, additional operation, for example with a diamond cutter. Such an operation is known from DE-AS 1,159,761, which describes a device in which such imperfections in a mechanically applied pattern on a layer are removed by means of engraving by a sort of planing tool.

A process which does not have such disadvantages has now been found.

The invention is characterized in that at least one metal basic layer to be perforated to form a screen is supported in intimate contact on both opposite surfaces during the irradiation by a supporting element adapted to the shape of the metal basic layer, using a release layer between a supporting element and the opposite surface of the metal layer, and after perforation the two supporting elements and the release layers are removed.

The supporting element is expediently also a metal layer.

Due to the fact that the layer intended for the metal screen lies between supporting elements adapted to the basic layer, the bulges or burrs which have formed on the edges of the recesses through the irradiation will not constitute any problem, because the layers of the supporting elements on which these imperfections form will not be used as a screen.

In a variant of the process of the invention which is particularly preferably a stack of metal basic layers, each to be perforated to form a screen, and between which release layers are present, during the irradiation is supported in intimate contact on the two opposite free surfaces by a supporting element adapted to the shape of the stack of layers, using a release layer between a supporting element and the opposite surface of the metal layers, and after perforation the two supporting elements and the release layers are removed.

When the present invention is used for the production of several screen layers in the same processing step, only one metal layer used as the supporting element will always act as the processing burr catcher, and will be discarded as a by-product.

The metal basic layer is expediently a copper or nickel-containing compound, preferably copper.

The release layer used according to the invention is preferably a layer of a metal compound, more particularly a layer of a metal oxide, metal sulphide or other metal salt. This layer must be sufficiently electrically conducting to permit successful production of the layer system by electroplating. The release layers are made more particularly by converting the surface of the supporting element opposite the basic sheet and/or the surface of the basic layer opposite the supporting element.

If a metal oxide layer is used as the metallic compound layer, the conversion preferably takes place using a mixture of potassium permanganate or potassium dichromate in an acid medium. For the formation of a metal sulphide layer it is preferable to use a sodium sulphide solution. Other layers of a metal compound are, for example, silver oxides and silver sulphides and the like. The conversion in that case preferably takes place using a silver-containing passivating solution.

In the process of the invention, the basic sheet is preferably 10–200 um thick, in particular 100 um, while the supporting elements are preferably 20–30 um thick, in particular 25 um.

If the supporting elements are of such thickness, after irradiation with high-energy, focused radiation these layers can be removed easily by a preferably mechanical material separation method.

The invention also relates to a device which is suitable for the production of a metal screen, comprising a metal basic layer and a supporting element adapted to the shape of the basic layer, and means for the production of perforations, which is characterized in that the device is also provided with means for applying of a release layer between a supporting element and the opposite surface of the metal basic layer, and means for the removal of the supporting elements and the release layers after the perforation operation.

The invention is explained in greater detail with reference to the example of an embodiment which follows.

A cylinder suitable for the production of a screen is provided with a layer of copper. If desired, a copper cylinder can, of course, be used.

The external surface of the cylinder is first provided with a thin sulphide film, preferably only a few hundredths of a um thick. The sulphide film is more particularly obtained by converting the surface layer. This conversion takes place by immersion in a bath containing a sodium sulphide solution.

A first copper layer about 100 um thick is applied to the copper sulphide film thus formed. This copper layer will in the end form the screen.

Another sulphide film is applied to this first copper layer, in the same way as indicated above.

Finally, a second copper layer is applied on this second sulphide layer. The thickness of this second copper layer is advantageously approximately 25 um.

The combination thus formed is subsequently subjected to high-energy, focused irradiation, forming recesses which extend into the substrate.

Any burrs formed under the influence of the radiation are not important because the copper layer intended for the screen is in the centre of the stack formed.

The second copper layer is then separated first, followed by the first copper layer.

In this way a screen which is provided with a desired perforation pattern, in which the perforations open out without burrs into the surfaces and have the same reproducible cross-sectional shape, is obtained. Bulges or edges (burrs) are therefore totally absent.

Figure 2:
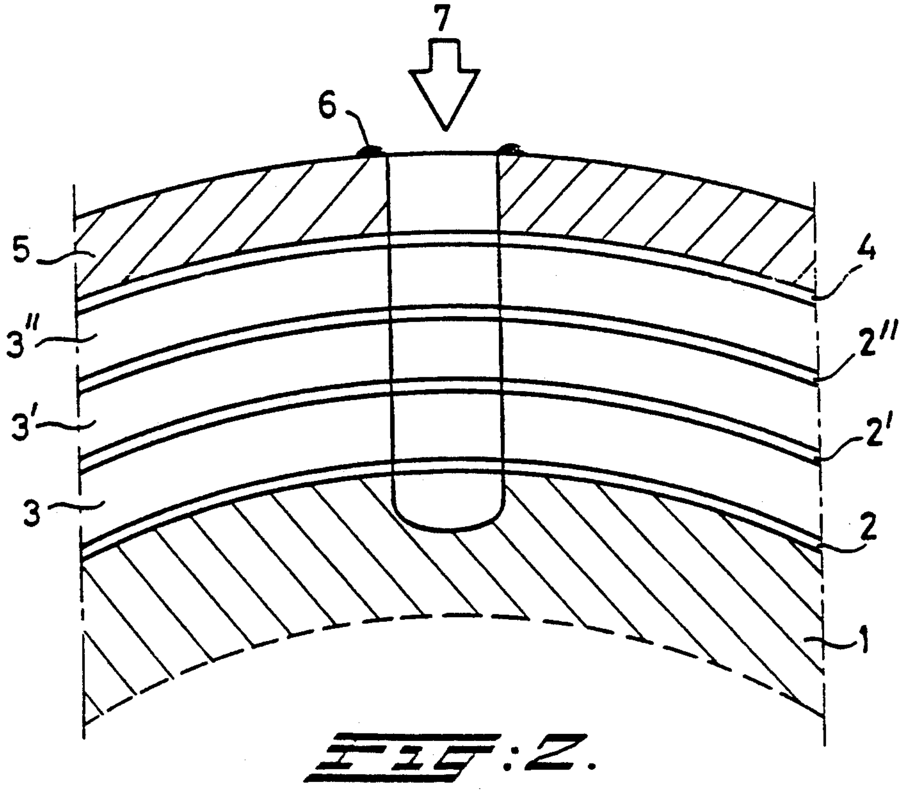

The invention is explained in greater detail with reference to the appended drawing, in which:

FIG. 1 shows schematically the successive layers used according to the process of the invention for the production of a single screen layer; and FIG. 2 shows a variant of the stack shown in FIG. 1 for the production of several screen layers in the same process step.

As shown in FIG. 1, a film 2 of copper sulphide only a few hundredths of a um thick is applied first on the copper cylinder 1. This film is formed by immersing the cylinder in a bath containing a sodium sulphide solution.

A copper layer 3 approximately 100 um thick is then applied in a manner which is known per se to this sulphide film. This copper layer will in the end form the desired screen. Another copper sulphide film 4 several hundredths of a um thick and a copper layer 5 approximately 25 um thick are then applied to this copper layer 3. Through irradiation with a source 7 of high-energy, focused irradiation the material present vaporizes, forming a recess; bulges 6 do occur through this irradiation, but they are on the outermost layer 5, which is removed after the irradiation.

In order to obtain the screen, the copper layer 5 and copper sulphide film 4 are first removed, and layer 3 is then removed. This removal is carried out in a simple manner, due to the fact that the mechanical adhesion between the successive copper layers is weak because of the copper sulphide films present. The screen thus obtained has perforations which are of the same cross-sectional shape all the way through the layer, and the perforations open onto the surface free from burrs.

After removal of the successive layers, the copper cylinder used can be smoothed out and re-used for a subsequent production step.

FIG. 2 shows an embodiment of FIG. 1 in which the successive layers are applied in such a way that several screen layers can be formed simultaneously in the same operation. More particularly, this embodiment comprises a copper cylinder 1 on which a copper sulfide film (2, 2', 2") and a copper layer (3, 3', 3") will form the desired screens after the operation. Although only three screen layers are shown in this embodiment, this number can be changed if desired. A copper sulphide film 4, followed by a copper layer 5, is again applied to the last copper layer (in this case layer 3"), in the same way as in the example of an embodiment shown in FIG. 1. After irradiation with energy-rich, focused irradiation, the outermost copper layer 5 is first removed. Through removal of the successive copper layers (3, 3', 3") with the copper sulphide film (2, 2', 2") applied, the screens (3, 3', 3") are subsequently obtained.

Although the invention is explained with reference to layers of copper and copper sulphide, it will be clear to the expert that other metals and metal compounds can also be used.

A ceramic/metal sandwich can also be used as the basic layer, while the layer can also be of different metals.

Finally, it is pointed out that the shape of the recesses made in the layers can also be conical.

The successive layers are then provided with the same pattern of perforations, but they are of different diameters.

The term "screen" should also be interpreted in the widest sense. With the process of the invention it is not only possible to make a regular pattern of perforations in the layers; by programmed control of the beam of high-energy irradiation it is also possible to apply any desired pattern of perforations in the layers.

I claim:

1. A process for the production of a metal-containing screen which comprises irradiating with high energy, focused radiation, one or more metal-containing basic layers to be perforated to form a screen, wherein at least one metal-containing basic layer is brought into intimate contact on both its opposite surfaces during the irradiation with a covering element, each covering element adapted to the shape of the basic layer, placing a release layer between the covering elements and the respective surfaces of the basic layer and, after perforation by irradiating, removing the covering elements and the release layers.

2. A process according to claim 1, in which a stack of basic layers is irradiated, each being perforated to form a screen, wherein release layers are placed between the basic layers during the irradiation and wherein two opposite free surfaces are brought into intimate contact with a covering element adapted to the shape of the stack of basic layers and wherein a release layer is placed between the covering element and the opposite surface of the basic layer and after perforating the basic layers, removing the two covering elements and the release layers.

3. A process according to claim 2, wherein the basic layer is comprised of a metal, a combination of metals, or a combination of metal and ceramic layers.

4. A process according to claim 2, wherein the basic layer is comprised of a copper or nickel containing compound.

5. A process according to claim 2, wherein the release layer is comprised of a layer of a metal oxide or metal sulfide.

6. A process according to claim 2, wherein the release layer is comprised of a copper oxide or nickel oxide.

7. A process according to claim 2, wherein the release layer is comprised of a copper sulfide or nickel sulfide.

8. A process according to claim 2, wherein the release layers are formed by converting the outer surfaces of the respective underlying layers.

9. A process according to claim 8, wherein the conversion is carried out with an oxidant chosen from a solution of potassium permanganate or potassium dichromate in an acid medium.

10. A process according to claim 8, wherein the conversion is carried out with a metal sulfide solution.

11. A process according to claim 8, wherein the conversion is carried out with a silver containing passivating solution.

12. A process according to claim 2, wherein the basic layer is 10–200 μm thick, while the covering elements are 20–30 μm thick.

13. A process according to claim 2, wherein the basic layer is approximately 100 μm thick, while the covering elements are approximately 25 μm thick.

14. A process according to claim 2, wherein at least a part of the perforations produced in a basic layer are connected one after another.

15. A process according to claim 8, wherein the conversion is carried out with a sodium sulfide solution.

16. A method for perforating a metal layer by irradiating the layer with high-energy radiation, wherein the metal layer is covered in intimate contact on the surface, turned away from the radiation source, during the irradiation, by a covering element adapted to the shape of the metal layer, that the irradiation is such that said covering element is only partially penetrated thereby and that after perforation the covering element is removed to recover a perforated metal layer, and wherein a release layer is used between the covering element and the metal layer.

17. A method according to claim 16, wherein the covering element is supported by a carrier during the perforation, on the side turned away from the metal layer.

18. A method according to claim 16, wherein the metal layer is 10–20 μm thick, and the covering element is 20–30 μm thick.

19. A method according to claim 16, wherein the metal layer is comprised of a metal, a combination of metals or a combination of metal and ceramic material.

20. A method according to claim 16, wherein the metal layer is comprised of a copper or nickel containing compound.

21. A method according to claim 16, wherein the release layer is comprised of a layer of a metal oxide or metal sulfide.

22. A method according to claim 16, wherein the release layer is comprised of a copper sulfide or nickel sulfide.

* * * * *